Oct. 3, 1950 — D. BLITZ — 2,524,282
FREQUENCY MODULATION RADIO-ECHO DISTANCE INDICATOR
Filed May 30, 1945
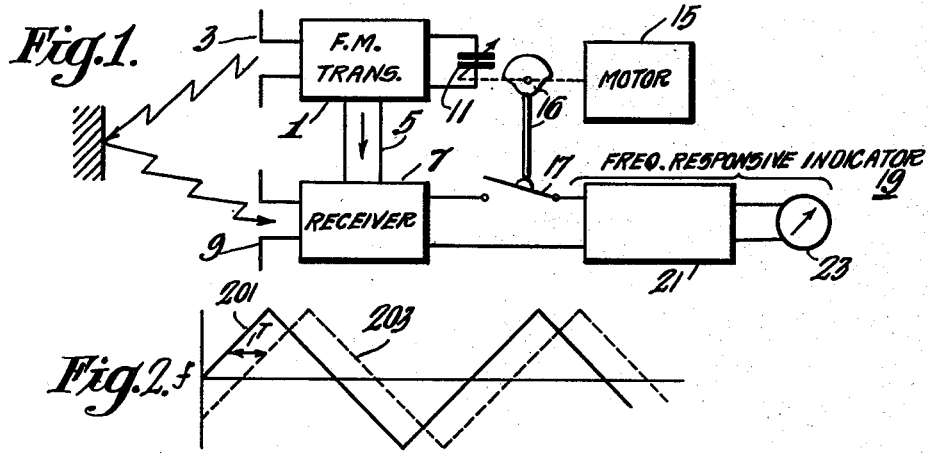
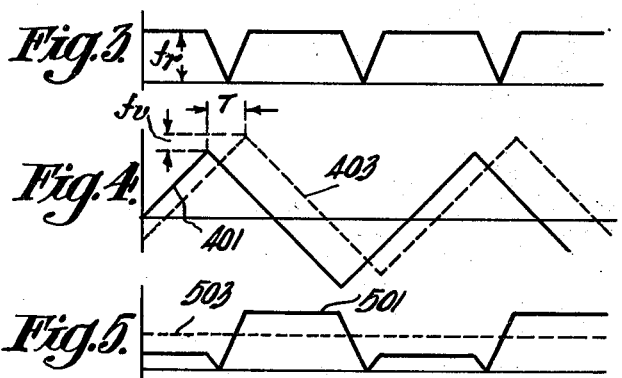
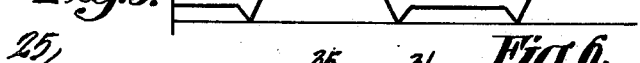
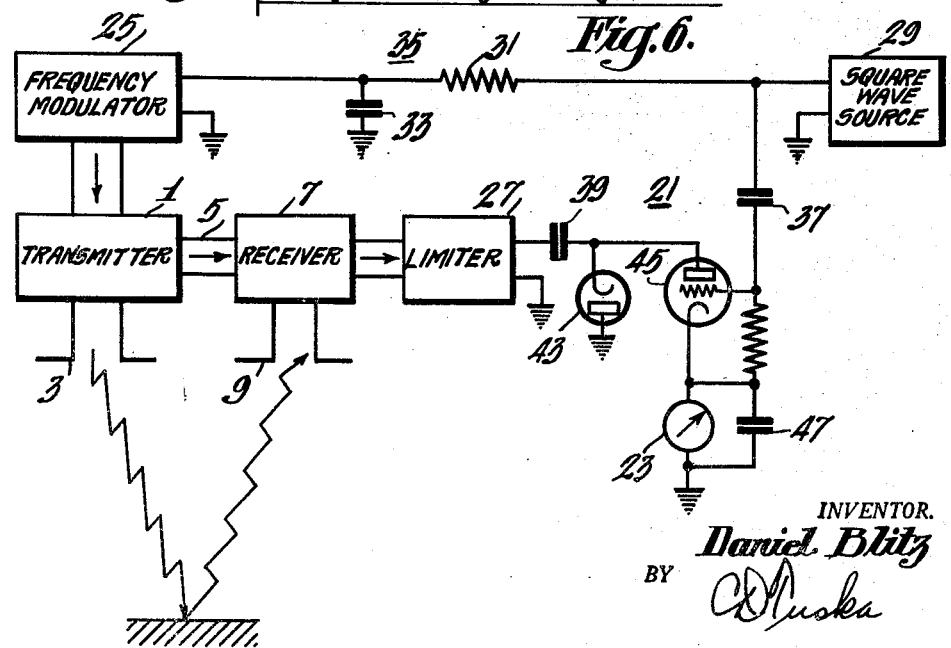
INVENTOR.
Daniel Blitz
BY
ATTORNEY Patented Oct. 3, 1950

2,524,282

UNITED STATES PATENT OFFICE 2,524,282

FREQUENCY MODULATION RADIO-ECHO DISTANCE INDICATOR

Daniel Blitz, Princeton, N. J., assignor to Radio Corporation of America, a corporation of Delaware Application May 30, 1945, Serial No. 596,692

5 Claims. (Cl. 343—14)

This invention relates to distance measuring devices such as absolute altimeters, and more particularly to improvements in systems which operate by reflection of frequency modulated signals.

Frequency modulation altimeters are well known, being described in Bentley Patent 2,011,392 and in Espenschied Patent 2,045,071. In these systems a frequency modulated signal is radiated to the surface or object whose distance is to be measured. In a receiver located near the point of radiation, the reflected signal is picked up and mixed or heterodyned with some of the frequency modulated signal received directly from the transmitter. The average frequency of the resulting beat signal is determined by the time required for the radiated signal to reach the reflecting object and return to the receiver, and is directly proportional to the distance. The beat signal is applied to a frequency responsive indicator, calibrated in units of distance.

The indicator usually includes a cycle counter circuit and a direct current meter, but may comprise a frequency responsive servo system such as that shown in Guanella Patent 2,268,587. In any case, the indicator system will exhibit a substantially unavoidable time lag owing to mechanical and electrical damping of the system which is necessary to prevent unsteady or erratic indication.

This time lag causes no difficulty as long as the distance being measured is constant, or changing slowly. However, when the distance is increasing, or decreasing, the indication will differ from the true distance by an amount $vt$, where $t$ is the time lag and $v$ is the rate of change of distance. Under conditions of rapidly changing distance, this error may become undesirably large.

It is the object of the present invention to provide methods of and means for improving the accuracy of systems of the described type by compensating the indicator time lags.

The invention will be described with reference to the accompanying drawings, wherein:

Figure 1 is a schematic block diagram of a frequency modulation distance measuring system embodying the present invention, Figure 2 is a graph showing the variations in frequency of signals transmitted and received in the operation of the system of Figure 1 when the distance being measured remains constant, Figure 3 is a graph of the frequency of the beat signal derived from the signals shown in Figure 2.

Figure 4 is a graph showing the variations in frequency of signals transmitted and received in the operation of the system of Figure 1 when the distance being measured is decreasing, Figure 5 is a graph of the frequency of the beat signal derived from the signals shown in Figure 4, and Figure 6 is a schematic diagram of a modification of Figure 1, showing details of an indicator system including an electronically switched counter circuit.

Referring to Figure 1, a radio transmitter 1 is coupled to an antenna 3, and through a transmission line 5 to a receiver 7. The receiver 7 is also provided with an antenna 9.

The frequency of operation of the transmitter 1 is controlled by a resonant circuit including a variable capacitor 11. The capacitor 11 is mechanically coupled, as indicated by the dash line 13, to a motor 15, in such manner that continuous operation of the motor will vary cyclically the frequency of the output of the transmitter.

The output circuit of the receiver 7 is connected through a switch 17 to a frequency responsive indicator system, including a counter or discriminator circuit 21 connected to a meter 23. The meter 23 may be calibrated in units of distance, such as feet. The switch 17 is coupled to the motor 15 by means 16 in such manner that the switch 17 is closed while the frequency of the transmitter 1 is increasing, and opened while the frequency of the transmitter 1 is decreasing.

In the operation of the described system, the motor 15 continuously drives the capacitor 11, varying the frequency of operation of the transmitter 1. For simplicity of explanation, it is assumed that the variation of frequency is a linear triangular function of time, as shown by the solid line 201 of Figure 2. However, this is not essential to the practice of the invention, as sinusoidal or other cyclical variations of the transmitter frequency may be used.

A small portion of the output of the transmitter 1 is conducted directly to the receiver 7 through the transmission line 5. The major portion of the transmitter output is radiated from the antenna 3. Some of the radiated energy strikes the object whose distance is to be measured, and is reflected back to the receiver antenna 9. The received reflected signal varies in frequency like the transmitted signal, but is delayed with respect thereto by the time required for the radiation to travel to the reflecting object and back again to the receiver antenna. This time is $$\frac{2A}{c}$$

where $A$ is the distance being measured and $c$ is the velocity of propagation of the radiated signal. The dash line 203 of Figure 2 shows the frequency variations of the received signal.

Under constant distance conditions, the received signal differs in frequency from the transmitted signal (except during the "crossover" periods, which are negligibly small in practice) by an amount $f_r$ which is proportional to the product of the rate of change of the transmitted frequency and the delay time;

$$f_r = \frac{2A}{c} \frac{df}{dt}$$

The rate of change $$\frac{df}{dt}$$

of the transmitter frequency is constant, and is equal to $2f_m f_s$ where $f_m$ is the modulation frequency and $f_s$ is the sweep width, i. e. the difference between the lowest and highest frequencies produced by the transmitter during each modulation cycle. Therefore, $$f_r = \frac{4f_m f_s A}{c}$$

and is directly proportional to $A$.

The output of the receiver 7 includes a beat signal of frequency $f_r$ produced by mixing the signals received on the antenna 9 and the line 5. The frequency of the beat signal as a function of time is shown by the graph of Figure 3. During increase of transmitter frequency, the switch 17 is closed, and the beat signal is applied to the indicator system 19. During decrease of transmitter frequency, the switch 17 is opened, disconnecting the indicator system. Owing to inertia and damping of the indicator system, the meter 23 will show a substantially steady deflection in accordance with the frequency $f_r$, although the beat signal is cut off during substantially half of each modulation cycle. It should be noted at this point that a certain minimum amount of damping in the indicator circuit is unavoidable, and that as a practical matter some additional damping ordinarily would be required to provide a steady indication even if both halves of the modulation cycle were utilized.

Since the meter deflection is a function of the beat frequency $f_r$, it is a similar function of the distance $A$.

Now assume that the distance $A$ is decreasing, at a rate $v$. The average frequency of the beat signal decreases at a corresponding rate. In a prior art system, using both halves of the modulation cycle, the distance indication will lag the time distance, causing the meter 23 to read too high by the amount $vt$.

Referring to Figure 4, the transmitted signal is represented by the line 401, identical with the line 201 of Figure 2. Owing to Doppler effect, the received signal is higher in frequency than it would be if the distance $A$ were constant, by an amount $f_v$, proportional to the rate of decrease of distance $v$:

$$f_v = \frac{2f_0 v}{c}$$

where $f_0$ is the mean transmitted frequency. The variation in frequency of the received signal under this condition is shown by the dash line 403 of Figure 4.

The beat frequency is $f_r - f_v$ during increase of transmitter frequency, and $f_r - f_v$ during decrease of transmitter frequency, as illustrated by the solid line 501 in Figure 5. The average beat frequency $f_r$ is shown by the dash line 503 in Figure 5, and is proportional to the distance $A$.

Since the switch 17 is closed only during increase of frequency of the transmitted signal, only the beat signal of frequency $f_r - f_v$ is applied to the indicator system 19. The decrease in frequency $f_v$ is equivalent to the decrease $\Delta f_r$ which would be produced by a decrease $\Delta A$ in the distance $A$:

$$\Delta f_r = f_v = \frac{4f_m f_s \Delta A}{c} = \frac{2f_0 v}{c}$$

Thus the beat frequency corresponds to a distance less than the true distance $A$ by the amount $\Delta A$, proportional to the rate of change of distance $v$:

$$\Delta A = \frac{f_0}{2f_m f_s} v$$

The distance indicated by the meter 23 is:

$$A + vt - \frac{f_0}{2f_m f_s} v$$

By making the indicator time lag $t$ equal to the Doppler factor $$\frac{f_0}{2f_m f_s}$$

the indicated distance is made to equal the true distance regardless of $v$, the rate of change of distance.

The operation of the system with increasing distance is similar to that with decreasing distance. Doppler effect reduces the frequency of the received signal, causing the beat frequency to be $f_r + f_v$ during increase of transmitted frequency. This tends to make the indicator read high, compensating the tendency to read low because of the lag $vt$.

The quantities $t$ and $$\frac{f_0}{2f_m f_s}$$

may be made equal by choosing suitable values for the mean transmitter frequency $f_0$, the modulation frequency $f_m$, and the sweep width $f_s$, or by adjusting the indicator time lag $t$. Since some of the above factors are ordinarily determined in accordance with other design considerations, it may be impractical in some cases to make $$\frac{f_0}{2f_m f_s}$$

as small as $t$. In this event, the driving means 16 for the switch 17 may be adjusted to phase the switch operation with respect to the modulation so as to connect the indicator 19 during a part of the downsweep portion of the modulation cycle. This will diminish the Doppler compensation of the indicator by any required amount.

The present invention may be practiced by various means other than that shown in Figure 1. Referring to Figure 6, wherein elements similar to those of Figure 1 are designated by corresponding reference characters, the transmitter 1 is connected to a frequency modulator 25, which may be a vibratory capacitor, or any other known device for varying the frequency of operation of the transmitter in accordance with an applied voltage. A square wave source 29 is connected through a wave shaping circuit 35 to the modulator 25. The circuit 35 may be an integrating circuit comprising a series resistor 31 and a shunt capacitor 33 as shown, or any known system for converting the square wave input to a form suitable for cyclically varying the frequency of the transmitter 1 through the modulator 25.

The receiver 7 is connected through an amplitude limiter 27 to a counter circuit 21, including a diode 43 and a triode 45. The cathode of the diode 43 and the anode of the triode 45 are connected together to a capacitor 39, which is connected to the output circuit of the limiter 27. The anode of the diode 43 is grounded. The cathode of the triode 45 is connected through the meter 23 to ground. The meter 23 is shunted by a capacitor 47.

The control grid of the triode 45 is coupled to the square wave source 29 through a blocking capacitor 37. The polarities of the connections from the source 29 to the modulator 25 and the triode 45 are such that the grid of the triode 45 is driven negative while the modulator 25 is decreasing the transmitter frequency.

The operation of the system of Figure 6 is similar to that of Figure 1. During increase of transmitter frequency, the triode 45 is conductive and acts substantially like a diode. A pulsating current, having an average value which is a predetermined function of the beat frequency, flows through the triode 45 to the meter 23 and the capacitor 47. The capacitor 47 integrates the pulsations to provide a substantially steady deflection of the meter 23.

During decrease of transmitter frequency, the triode 45 is cut off, but substantially the same current flows through the meter 23 by partial discharge of the capacitor 47. The principal part of the indicator time lag $t$ in the system of Figure 6 is caused by the capacitor 47. This is compensated, as in the system of Figure 1, by the Doppler shift in the frequency of the received signal.

It will be apparent without further illustration to those skilled in the art that a sine wave or other A.-C. source may be substituted for the square wave source 29 in the system of Figure 6. In this case the transmitter frequency will not vary linearly with time, and the beat frequency will vary throughout the modulation cycle. However, the average beat frequency during increase of transmitter frequency will differ from the average taken over the whole modulation cycle by an amount proportional to the rate of change of distance, as with linear modulation. By proper adjustment of the system, this effect will compensate the indicator lag as well as if linear triangular wave modulation were being used.

With sinusoidal modulation, the wave shaping circuit 35 acts as a phase shifter to time the modulation cycle with reference to the counter operation. By adjustment of either the capacitor 33 or the resistor 31, the counter may be made to operate during a part of the decreasing frequency portion of the cycle, as mentioned above with reference to the system of Figure 1.

The invention has been described as an improved distance measuring system of the frequency modulation type, wherein the effects of lag in the response of the indicator system are compensated by utilizing the Doppler effect. The beat signal is applied to the indicator during substantially only the periods of increase of transmitter frequency, when the Doppler effect is such as to cause anticipation of the true distance. The indicator lag is made equal to the Doppler anticipation, providing a correct indication of true distance substantially regardless of the rate of change of distance.

I claim as my invention:

1. A distance measuring system including means for transmitting a frequency modulated signal to an object whose distance is to be determined, means for receiving said signal after reflection by said object, means responsive to said transmitted and received signals to provide a beat signal of frequency equal to the difference in frequency of said transmitted and received signals, a frequency responsive visual indicator including a meter which exhibits a time lag in its response to variations in beat frequency, and means for applying said beat signal to said indicator substantially only during increase in frequency of said transmitted signal, whereby variations of said beat frequency caused by Doppler effect tend to anticipate said lag and wherein $$t = \frac{f_o}{2f_m f_s}$$

where $t$ is the time lag of the indicator, $f_o$ is the mean transmitter frequency, $f_m$ is the number of frequency modulation sweeps per second, and $f_s$ is the frequency sweep width in cycles per second.

2. A distance measuring system including means for transmitting a frequency modulated signal to an object whose distance is to be determined, means for receiving said signal after reflection by said object, means responsive to said transmitted and received signals to provide a beat signal of frequency equal to the difference in frequency of said transmitted and received signals, a frequency responsive visual indicator including a meter which exhibits a time lag in its response to variations in frequency, means for applying said beat signal to said indicator, and means preventing response of said indicator to said beat signal substantially only during decrease in frequency of said transmitted signal, and wherein $$t = \frac{f_o}{2f_m f_s}$$

where $t$ is the time lag of the indicator, $f_o$ is the mean transmitter frequency, $f_m$ is the number of frequency modulation sweeps per second, and $f_s$ is the frequency sweep widths in cycles per second.

3. A distance measuring system including means for transmitting a frequency modulated signal to an object whose distance is to be determined, means for receiving said signal after reflection by said object, means responsive to said transmitted and received signals to provide a beat signal of frequency equal to the difference in frequency of said transmitted and received signals, and a visual indicator responsive to the frequency of said beat signal substantially only during increase in frequency of said transmitted signal, said indicator exhibiting a predetermined time lag in its response to variations in frequency of said beat signal, and wherein $$t = \frac{f_o}{2f_m f_s}$$

where $t$ is the time lag of the indicator, $f_o$ is the mean transmitter frequency, $f_m$ is the number of frequency modulation sweeps per second, and $f_s$ is the frequency sweep width in cycles per second.

4. A distance measuring system including a radio transmitter, means for cyclically varying the frequency of operation of said transmitter, a radio receiver near said transmitter and coupled thereto, a counter circuit coupled to the output circuit of said receiver, a current indicator comprising a meter connected to said counter, said counter and said indicator exhibiting a predetermined time lag in their responses, and means preventing operation of said counter circuit during decrease in the frequency of operation of said transmitter, and wherein $$t = \frac{f_o}{2f_m f_s}$$

where $t$ is the time lag of the indicator, $f_o$ is the mean transmitter frequency, $f_m$ is the number of frequency modulation sweeps per second, and $f_s$ is the frequency sweep width in cycles per second.

5. A distance measuring system including a radio transmitter, frequency modulator means connected to said transmitter, a source of modulating voltage connected to said modulator, a radio receiver near said transmitter and coupled thereto, a frequency responsive counter circuit coupled to said receiver and including an electron discharge tube provided with a control grid, an indicator connected to said counter circuit, and means for applying voltage from said modulating source to said control grid in such phase as to cut off said tube during decrease in the frequency of operation of said transmitter.

DANIEL BLITZ.

REFERENCES CITED

The following references are of record in the file of this patent:

UNITED STATES PATENTS

| Number | Name | Date |
|---|---|---|
| 2,011,392 | Bentley | Aug. 13, 1935 |
| 2,256,539 | Alford | Sept. 23, 1941 |
| 2,307,316 | Wolff | Jan. 5, 1943 |